(12) United States Patent
Bottasso et al.

(10) Patent No.: US 12,054,246 B2
(45) Date of Patent: Aug. 6, 2024

(54) HELICOPTER

(71) Applicant: LEONARDO S.P.A., Rome (IT)

(72) Inventors: Luigi Bottasso, Samarate (IT); Fabrizio Losi, Samarate (IT); Alessandro Nava, Samarate (IT); Sergio Sartori, Samarate (IT); Roberto Simonetta, Samarate (IT); Alessandro Airoldi, Samarate (IT); Matteo Boiocchi, Samarate (IT)

(73) Assignee: LEONARDO S.P.A, Rome (IT)

( * ) Notice: Subject to any disclaimer, the term of this patent is extended or adjusted under 35 U.S.C. 154(b) by 30 days.

(21) Appl. No.: 18/008,355

(22) PCT Filed: May 26, 2021

(86) PCT No.: PCT/IB2021/054606
§ 371 (c)(1),
(2) Date: Dec. 5, 2022

(87) PCT Pub. No.: WO2021/260460
PCT Pub. Date: Dec. 30, 2021

(65) Prior Publication Data
US 2023/0278703 A1    Sep. 7, 2023

(30) Foreign Application Priority Data
Jun. 25, 2020 (EP) .................................... 20182389

(51) Int. Cl.
*B64C 27/12* (2006.01)
(52) U.S. Cl.
CPC ........ *B64C 27/12* (2013.01); *F16D 2200/006* (2013.01)
(58) Field of Classification Search
CPC ... B64C 27/12; B64C 27/14; B64C 2027/125; F16D 2200/006
See application file for complete search history.

(56) References Cited

U.S. PATENT DOCUMENTS

| | | | | |
|---|---|---|---|---|
| 2,870,617 A | * | 1/1959 | Peters | F16D 3/845 |
| | | | | 464/175 |
| 3,068,668 A | * | 12/1962 | Buchleitner | F16D 3/845 |
| | | | | 277/504 |

(Continued)

FOREIGN PATENT DOCUMENTS

| | | |
|---|---|---|
| DE | 102015004302 A1 | 10/2016 |
| GB | 2113349 A | 8/1983 |
| JP | 2018059601 A | 4/2018 |

OTHER PUBLICATIONS

International Search Report and Written Opinion in corresponding International Patent Application No. PCT/IB2021/054606, mailed Jul. 27, 2021 (16 pages).

(Continued)

*Primary Examiner* — Brian M O'Hara
(74) *Attorney, Agent, or Firm* — Leason Ellis LLP (57) ABSTRACT

A helicopter is described comprising a motor member comprising an output shaft and a first stator rotatably supporting the output shaft around a first axis; a main rotor adapted to provide the lift necessary for the support and the thrust necessary for the movement of the helicopter; a transmission interposed between the motor member and the main rotor; the transmission rotatable around a second axis and a second stator rotatably supporting the input shaft around the second axis; the helicopter also comprises a joint interposed between the first and second stator, angularly fixed with respect to the first axis, and configured to allow an inclination between the first and second stator in a plane parallel to said first axis; the joint comprises a first corrugated element made of an elastically deformable material, interposed between said first and second stator, and adapted to allow the inclination through elastic deformation.

13 Claims, 4 Drawing Sheets

(56) References Cited

U.S. PATENT DOCUMENTS

| | | | | |
|---|---|---|---|---|
| 4,899,959 A * | 2/1990 | Weiler | ............... | B64D 35/00 |
| | | | | 244/54 |
| 5,360,376 A * | 11/1994 | Baldino | ............... | B64C 27/14 |
| | | | | 464/154 |
| 6,413,164 B1 * | 7/2002 | Vogl | ............... | F16D 3/72 |
| | | | | 464/79 |
| 10,435,136 B2 * | 10/2019 | Poster | ............... | B64C 27/14 |
| 11,162,572 B2 * | 11/2021 | Poster | ............... | B64C 27/12 |
| 11,305,891 B2 * | 4/2022 | Wall | ............... | B64F 5/50 |
| 11,912,402 B2 * | 2/2024 | Vayssiere | ............... | F16J 15/104 |
| 2018/0045310 A1 * | 2/2018 | Etzold | ............... | F16J 15/52 |

OTHER PUBLICATIONS

Anonymous: "Incident Report Agusta Bell AW109SP", Flight Safety Australia, Sep. 4, 2014 (Sep. 4, 2014), XP055753610, Retrieved from the Internet: URL:https://www.flightsafetyaustralia.com/2014/09/16-may-31-july-2014-6/ [retrieved on Nov. 24, 2020].

International Preliminary Report on Patentability in PCT Application No. PCT/IB2021/054606, mailed Nov. 3, 2021 (14 pages).

* cited by examiner

HELICOPTER

CROSS-REFERENCE TO RELATED APPLICATIONS

This Patent Application is a U.S. National Phase Application under 35 U.S.C. § 371 of International Patent Application No. PCT/IB2021/054606, filed on May 26, 2021, which claims priority from European Patent Application No. 20182389.5, filed on Jun. 25, 2020, incorporated by reference, as if expressly set forth in their respective entireties herein.

TECHNICAL FIELD

The present invention relates to a helicopter.

BACKGROUND ART

As is known, helicopters generally comprise:
a motor member, for example a turbine;
a main rotor; and
a main transmission formed by a train of gears which transmit the motion from an output shaft of the motor member to the main rotor with a suitable reduction ratio.

The motor member comprises, in turn, an output shaft and a first stator rotatably supporting the output shaft around the first axis.

The main transmission comprises, in turn, an input shaft and a second stator rotatably supporting the input shaft around the second axis.

According to a known solution, the helicopter also comprises:
a flexible rotating joint, for example with discs, interposed between the output shaft of the motor member and the input shaft of the main transmission to allow the transmission of a first torque from the output shaft of the motor member to the input shaft of the main transmission; and
a static articulated joint, for example a cardan joint, interposed between a first sleeve connected to the first stator of the motor member and a second sleeve connected to the second stator of the main transmission.

Both the flexible joint and the articulated joint must satisfy precise functional requirements.

In greater detail, the flexible rotating joint transfers a torque while allowing at the same time an angular misalignment by a few degrees between the output shaft of the motor member and the input shaft of the main transmission. The latter is subject to angular movements due to the loads of the rotor in operating conditions and/or due to the different operating regimes of the drive shaft and power take-off.

Similarly, the articulated joint must allow, in addition to the transmission of a second torque between the first and the second sleeve, an angular inclination by some degree between the aforesaid first and second sleeves for the same reasons described above with reference to the output member of the drive shaft.

Unlike the flexible joint, the articulated joint is static, i.e. it does not rotate around the axes of the first and second sleeves. The articulated joint serves only as a joint to allow for the misalignments mentioned above.

The articulated joint is also hollow and houses respective adjacent portions of the input and output shafts and the flexible joint of the drive shaft.

The flexible joint is integrally rotatable with the output shaft of the motor member and with the input shaft of the transmission.

The loads to which the articulated joint is subjected comprise a torque of variable entity which in normal operating conditions derives from the reaction of the motor torque. In particular emergency cases, for example in case of a blockage of the motor member, the torque can reach much higher values than under normal operating conditions. Furthermore, the articulated joint is also subjected to axial and shear loads, both under normal conditions and under particular conditions.

For example, in case of an impact, the axial and shear load values can be very high because the element serves to prevent the motor from collapsing on the transmission.

The inclination between the first and the second sleeve occurs in a pair of planes that are parallel to the rotation axes of the input and output shaft, that is, in the flexural planes of the aforesaid input and output shafts.

The articulated joints of the known type comprise, in particular, a plurality of rigid elements articulated between them in such a way as to allow the transmission of a high torque value and to allow the necessary misalignments/inclinations between the output shaft of the motor member and the input shaft of the transmission.

The need to connect the first sleeve of the motor member and the second sleeve of the transmission with an articulated joint which allows a high load capacity and torsional, axial and shear rigidity coupled with low flexural rigidity is felt in the sector.

This is in order to allow the transmission of the torque parallel to the rotation axes of the output and input shafts and, at the same time, the inclination of the first and second sleeves in the planes parallel to said rotation axes.

Furthermore, the need to satisfy these requirements by reducing the number of articulated components, the weights and the overall costs is felt in the sector.

The object of the present invention is to realise a helicopter which allows to satisfy at least one of the needs specified above in a simple and economical way.

XP055753610 discloses a helicopter with a cardan static joint interposed between a first stator of the motor and a second stator of the transmission. The cardan static joint allows the inclination between the first and the second stator in a plane parallel to a common axis of the first and second stator.

GB-A-2113349 discloses a constant velocity universal joint comprises an input element connected to an output element through the intermediary of a torque transmitting member in the form of a bellows made of flexible filamentary material reinforced by a binder capable of accommodating elastically the strain resulting from angular displacement between the axes of rotation of the input and output elements. The joint is preferably made by a method which comprises forming the bellows by applying filamentary material about an internal bellows shaping former and applying a flowable but settable reinforcing binder to the filamentary material. The former may be made of corrugated flexible material, subjected to internal fluid pressure while the filamentary material is wound onto it and left inside the bellows after formation. The bellows may comprise a plurality of interconnected disc-like elements.

DE-A-102015004302 discloses a hollow drive shaft for the torque-transmitting connection of two shafts, the tubular hollow drive shaft being made of a composite material and the hollow drive shaft having at least one cylindrical tubular end, wherein between the shaft (2 and the at least one cylindrical tubular end of the hollow drive shaft there is a radial gap, and that over this radial gap there is a clamping element that can be assembled and disassembled several times. A radially directed surface pressure is built up on the surface of the shaft and on the inner surface of the cylindrical tubular end of the hollow drive shaft, by means of which between the shaft and the hollow drive shaft a frictional and backlash-free torque transmission takes place.

JP-A-2018059601 discloses a coupling with a corrugated tube, two outer ring holding parts fitted and inserted into both ends of the corrugated tube, and two connection parts fitted and inserted into the outer ring holding parts. The corrugated tube is formed with a hollow tube-like body whose appearance is formed into a continuous pleat shape by bending and curving at least one thin plate, and both ends of the corrugated tube each have a first insertion part and a second insertion part. Terminals of the first and second insertion parts are each curved to form an edge warping part.

"Incident Report Agusta Bell AW109SP", Flight Safety Australia, XP055753610 discloses a helicopter that has conventional features that are disclosed and mentioned herein including in the claim section.

DISCLOSURE OF INVENTION

According to one embodiment of the invention, this object is achieved by a helicopter (1) that includes:
  at least one motor member (3) comprising an output shaft (12) and a first stator (11, 29) rotatably supporting said output shaft (12) around a first axis (C);
  a main rotor (4) adapted to provide the lift necessary for the support and the thrust necessary for the movement of the helicopter (1) itself;
  a transmission (7) interposed between said motor member (3) and said main rotor (4);
  said transmission (7) comprising, in turn, an input shaft (21) rotatable around a second axis (D) and a second stator (20, 30) rotatably supporting said input shaft (21) around said second axis (D);
  and
  a joint (35) interposed between said first and second stator (11, 29; 20, 30), angularly fixed with respect to said first axis (C), and configured to allow an inclination between said first and second stator (11, 29; 20, 30) in at least one plane parallel to said first axis (C);
  characterized in that said joint (35) comprises a first corrugated element (36) made of an elastically deformable material, interposed between said first and second stator (11, 29; 20, 30), and adapted to allow said inclination through elastic deformation;
  said first corrugated element (36) being torsionally rigid parallel to said third axis (E) and flexurally yielding in an elastic way in said at least one plane parallel to said third axis (E);
  said joint (35) comprising at least a second axial corrugated element (69, 70) coupled to said first corrugated element (36);
  the second corrugated element (69, 70) being shaped like a rib (69, 70) elongated parallel to said third axis (E) and eccentric with respect to said third axis (E).

BRIEF DESCRIPTION OF THE DRAWINGS

For a better understanding of the present invention, a preferred non-limiting embodiment is described below, purely by way of example and with the aid of the attached drawings, in which.

BEST MODE FOR CARRYING OUT THE INVENTION

With reference to the attached figures, 1 indicates a helicopter.

Figures 1, 4:
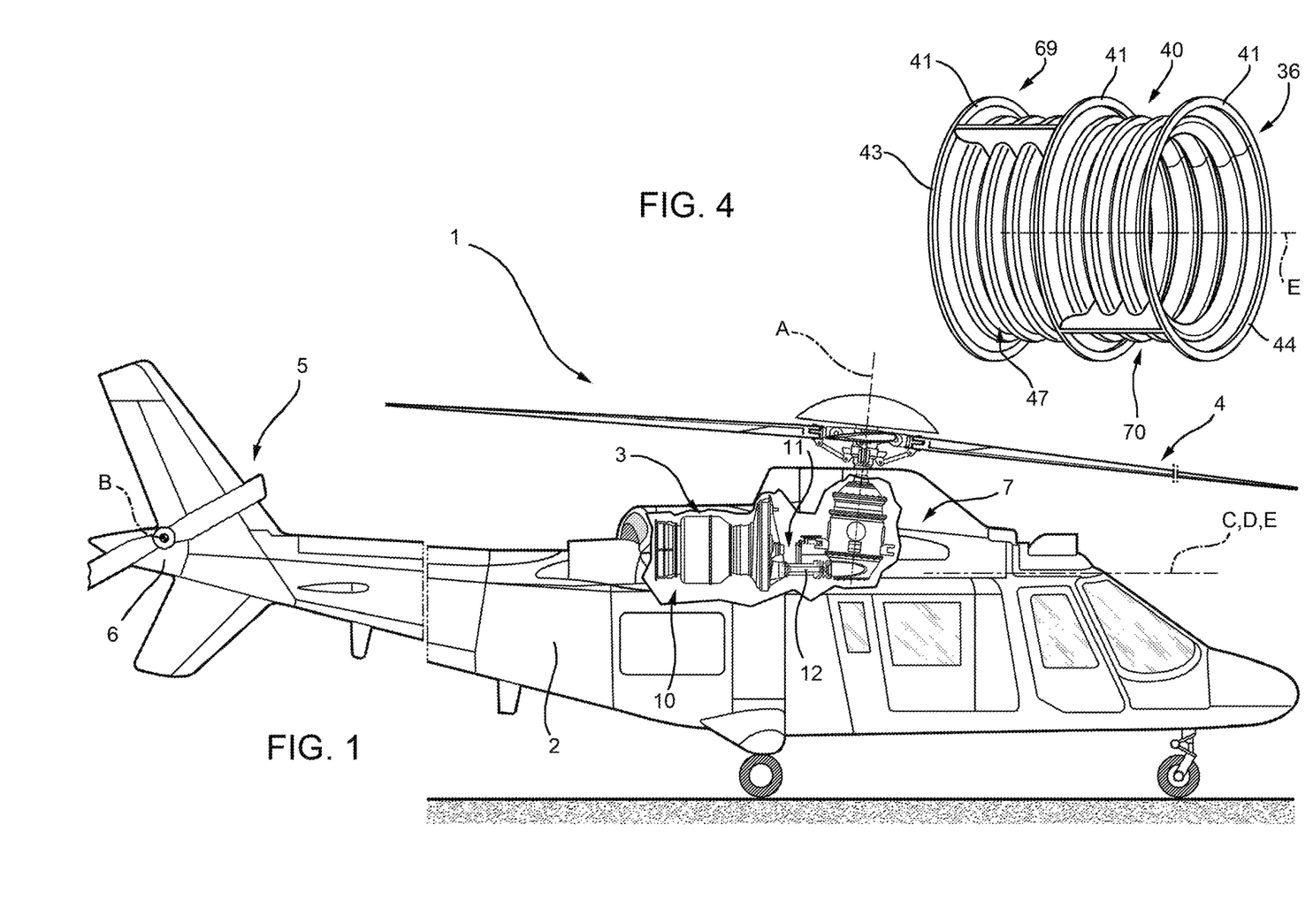
FIG. 1 is a side view of a helicopter realised according to the dictates of a first embodiment of the present invention.
FIG. 4 illustrates a perspective view according to a first visual angle of a particular embodiment of the static joint of the helicopter of FIGS. 1 and 2 in an undeformed condition.

The helicopter 1 essentially comprises:
  a fuselage 2;
  a motor group 3 formed, for example by one or more turbo-shaft systems 10;
  a main rotor 4 located at a top of the fuselage 2, rotatable around an axis A, and adapted to provide the lift and thrust necessary for the support and movement of the helicopter 1; and
  an anti-torque rotor 5, which is placed, in the case illustrated, at a tail end 6 of the fuselage 2 and is rotatable around its own axis transverse to the axis B.

The helicopter 1 also comprises a main transmission group 7 interposed between the motor group 3 and a control shaft 8 of the rotor 4.

The motor group 3 (FIG. 2) essentially comprises:
  a stator 11 housing the systems 10;
  an output shaft 12 of the systems 10 and rotatable around an axis C.

Figures 2, 7:
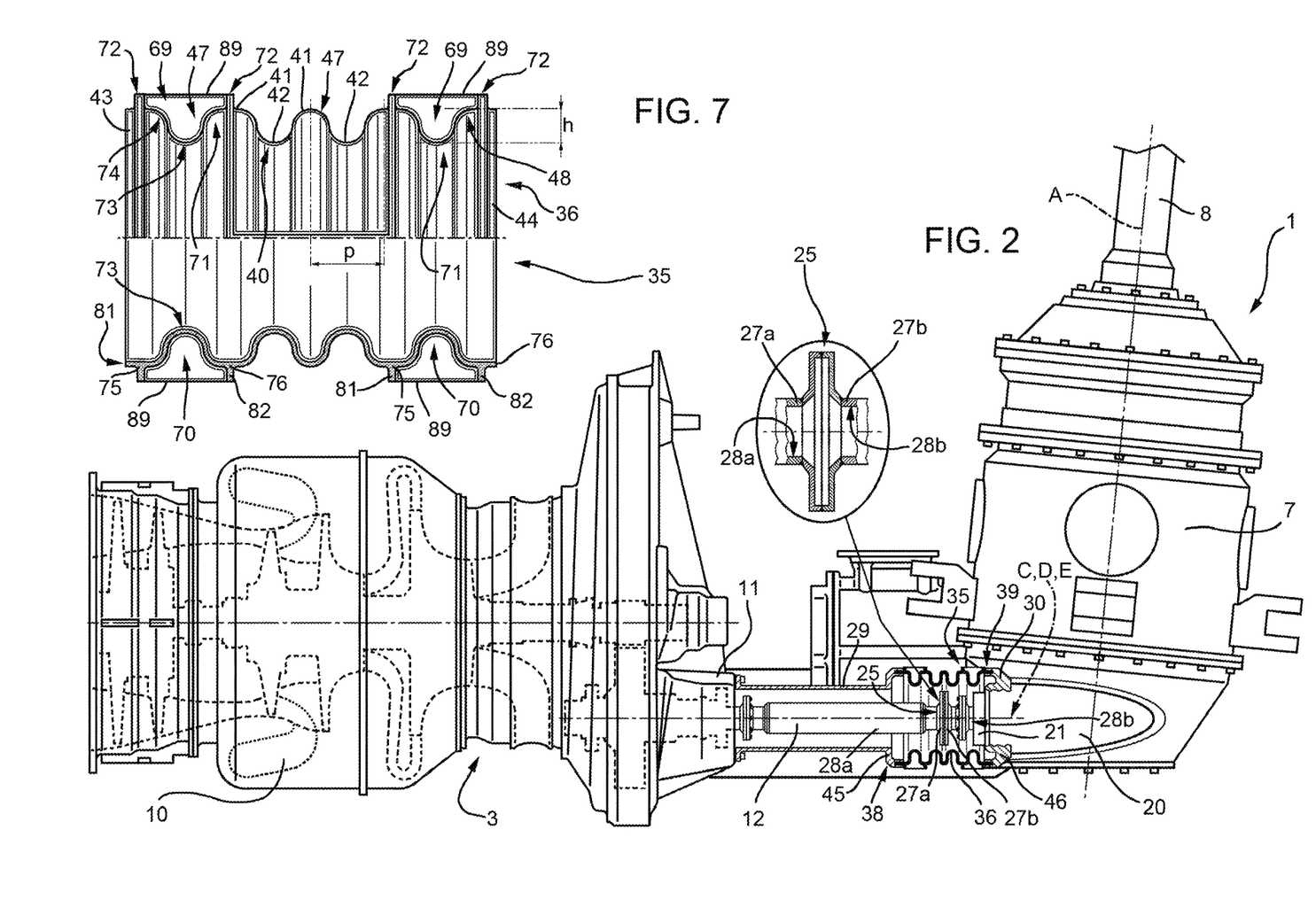
FIG. 2 illustrates on an enlarged and partially sectioned scale some components of the helicopter of FIG. 1, with parts removed for clarity's sake.
FIG. 7 illustrates a side view of the static joint of FIGS. 5 to 6 in an undeformed condition.

The transmission group 7 essentially comprises:
  a stator 20; and
  an input shaft 21 rotatable around an axis D, coinciding with the axis C in the case illustrated.

The helicopter 1 also comprises a joint 25 rotatable around the axes C, D and interposed between the output shaft 12 and the input shaft 21.

The joint 25 is adapted to transmit the driving torque generated by the motor group 3 to the input shaft 21 of the transmission group 7.

In the case illustrated, the joint 25 comprises a pair of discs 27a, 27b carried respectively by opposite ends 28a, 28b adjacent to the respective output shaft 12 and input shaft 21.

The stators 11, 20 have respective sleeves 29, 30 which are angularly fixed with respect to the relative axes C, D.

The sleeves 29, 30 are hollow and respectively house a portion of the output shaft 12 and a portion of the input shaft 21 defining the respective ends 28a, 28b.

The helicopter 1 also comprises a joint 35 interposed between the sleeves 29, 30, angularly fixed with respect to the axes C, D and configured to allow an angle of inclination, for example by two degrees, between the sleeves 29, 30 in a pair of planes parallel to the axis C, D.

In greater detail, said planes correspond to the planes of elastic inflection of the output shaft 12 and the input shaft 21.

Advantageously, the joint 35 comprises a corrugated element 36 made of an elastically deformable material, interposed between the sleeves 29, 30 and adapted to allow said angle of inclination through its own elastic deformation.

In other words, the corrugation of the corrugated element 36 allows to obtain an elastic flexural deformability such as to allow the inclination between the sleeves 29, 30 in the aforesaid planes.

The corrugated element 36 extends axial-symmetrically around an axis E, in the case illustrated.

Figure 5:
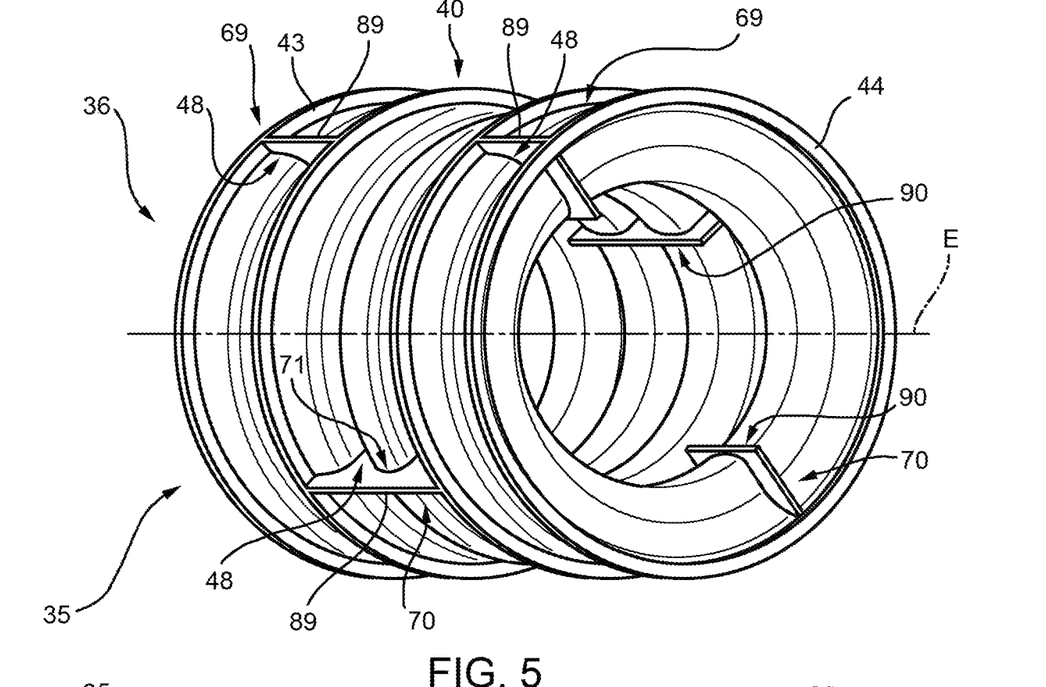
FIG. 5 illustrates a perspective view, on an enlarged scale and according to a second visual angle of a different embodiment of the static joint of FIG. 4 in an undeformed condition.
Figure 6:
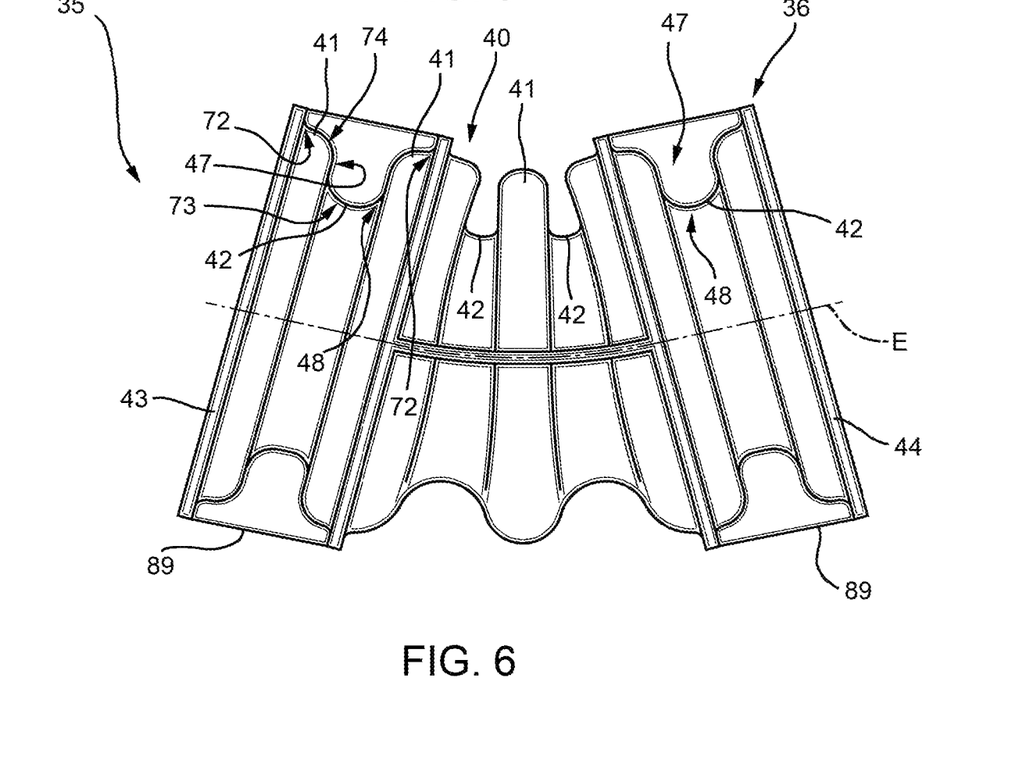
FIG. 6 illustrates a side view of the static joint of FIG. 5 in a flexurally deformed condition.

The axis E coincides with the axes C, D when the corrugated element 36 is undeformed (FIG. 5) and is inflected with respect to the axes C, D when the corrugated element 36 deforms flexurally (FIG. 6).

The term "corrugation" means, in the following of the present description, a continuous succession or continuous in some stretches and periodic succession of annular ridges and grooves around the axis E.

The corrugation has, in a section containing the axis E:
a longitudinal direction of extension along which the ridges and the grooves are periodically repeated; and
a transverse direction orthogonal to the direction of extension and along which the ridges and the grooves extend at a distance between them.

The distance between two consecutive ridges (grooves) along the longitudinal direction is called pitch p of the corrugation.

The distance between the ridges and the grooves along the transverse direction is called height h of the corrugation.

With reference to FIG. 2, the joint 35 essentially comprises a pair of flanges 38, 39 protruding from respective axial ends of the sleeves 29, 30 opposite respectively to the motor group 3 and to the transmission group 7.

In the case illustrated, the flanges 38, 39 extend orthogonally to the respective axes C, D.

The corrugated element 36 is axially interposed between the flanges 38, 39 and is connected to the flanges 38, 39 itself.

The element 36 has a corrugation 40 with a longitudinal direction of extension parallel to the axis E and a thickness radial to the axis E.

The corrugation 40 comprises respective pluralities of rings 41, 42.

The rings 41, 42 are alternated between them parallel to the axis E and define respective radial ends opposite one another of the corrugation 40.

The rings 41 are arranged at a first radial distance from the axis E and define respective ridges of the corrugation 40.

The rings 42 are arranged at a second radial distance from the axis E smaller than the aforesaid first axial distance and define respective grooves of the corrugation 40.

The rings 41 (42) are all arranged at the same first (second) radial distance from the axis E, in the case illustrated.

The corrugation 40 has a plurality of connecting annular stretches 47, each interposed between a respective ring 41 and the respective rings 42 adjacent thereto.

Each stretch 47 extends starting from the respective ring 41 at progressively increasing axial and radial distances towards the respective rings 42.

The corrugation 40 has a coil shape in the section parallel to the axis E, in the case illustrated.

The corrugation 40 is symmetrical with respect to the axis E.

The rings 41, 42 lie on respective planes orthogonal to the axis E.

The corrugation 40 also comprises axial ends 43, 44 opposite one another and of annular shape.

The ends 43, 44 are connected to respective radially external ends 45, 46 of respective flanges 38, 39.

With reference to FIGS. 3 to 7, the joint 35 also comprises a plurality of ribs 69, 70 connected to the element 36 and adapted to confer axial rigidity to the joint 35 itself.

The ribs 69, 70 are arranged externally to the element 36 with reference to the axis E and eccentrically with respect to the axis E itself.

Each rib 69, 70 is elongated along the axis E and extends over an arc around the axis E of a smaller width than the length of the rib 69, 70 along the axis E.

Furthermore, each rib 69, 70 has a total dimension that is radial to the axis E which is greater than its extension circumferentially to the axis E itself.

Each rib 69, 70 is axially delimited by a pair of stretches 81, 82 opposite one another and shaped like an arc (FIG. 7).

Each rib 69, 70 is also delimited in a position radially external to the axis E by a straight stretch 89 that is parallel to the axis E.

Each rib 69, 70 is furthermore delimited in a position radially internal to the axis E by a respective corrugation 71 coupled to a respective portion 48 of the corrugation 40 of the element 36.

The stretch 89 and the corrugation 71 are radially opposite one another and extend between the stretches 81, 82.

The corrugation 71 has a longitudinal direction of extension parallel to the axis E and a thickness radial to the axis E.

The corrugation 71 comprises respective pluralities of ridges 72 and grooves 73, in the case illustrated.

The ridges 72 and the grooves 73 are alternated between them parallel to the axis E and define respective radial ends opposite one another of the corrugation 40.

The ridges 72 are arranged at a first radial distance from the axis E.

The grooves 73 are arranged at a second radial distance from the axis E that is smaller than the aforesaid first radial distance.

The ridges 72 (the grooves 73) are all arranged at the same first (second) radial distance from the axis E, in the case illustrated.

In particular, the ridges 72 and the grooves 73 respectively define the points of maximum and minimum distance of each rib 69, 70 from the axis E.

The corrugation 71 has a plurality of connecting stretches 74, each interposed between a respective ridge 72 and the respective grooves 73 adjacent thereto.

Each stretch 74 extends starting from the respective ridge 72 at progressively increasing axial and radial distances towards the respective grooves 73.

The corrugation 71 has a coil shape in the section parallel to the axis E, in the case illustrated.

Figure 3:
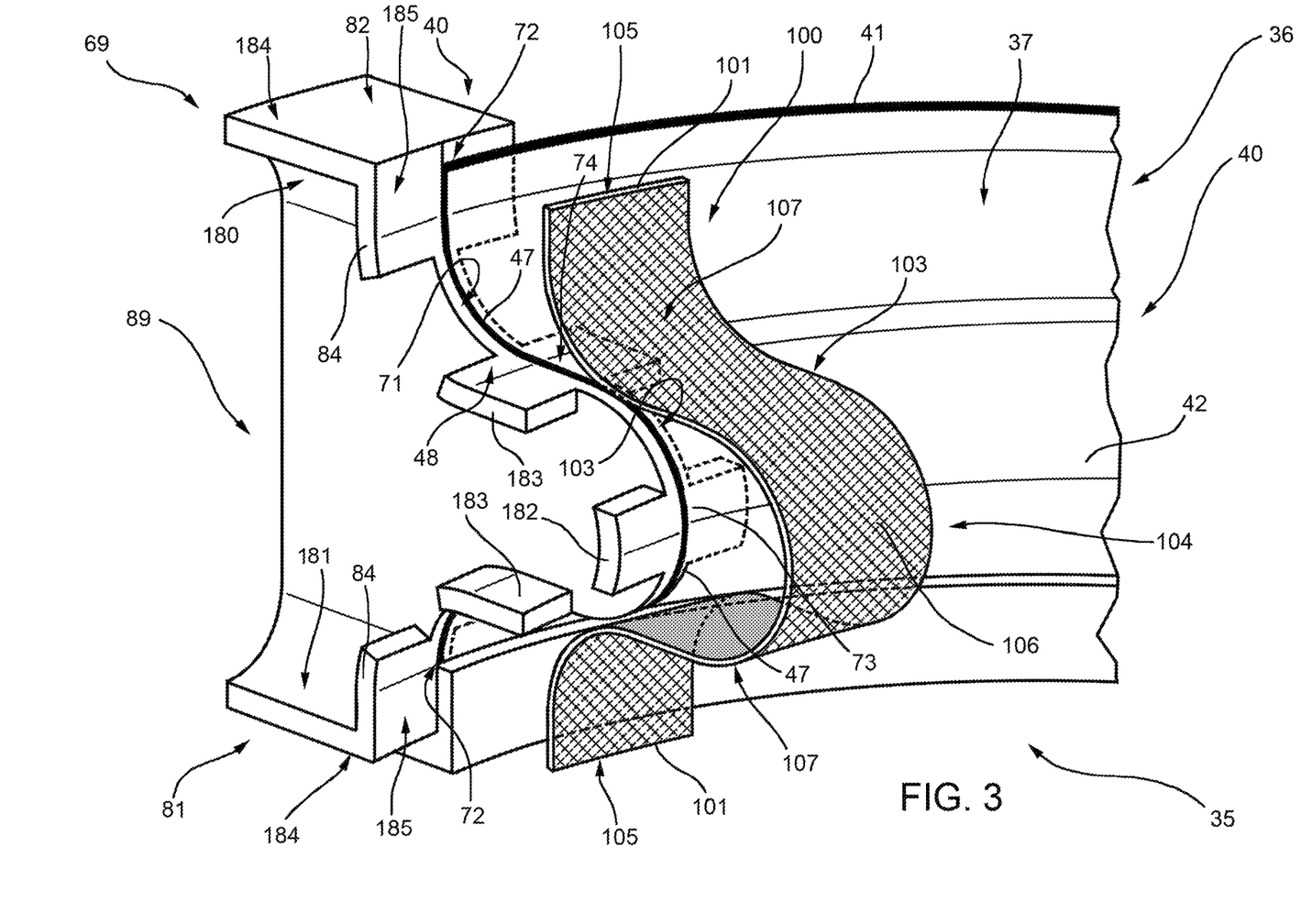
FIG. 3 illustrates a perspective view and on a further enlarged scale of some details of a static joint of the helicopter of FIGS. 1 and 2, with parts removed for clarity's sake.

Each rib 69 is connected, glued in the illustrated case, on the relative portion of the corrugation 40, so that the respective ridges 72 and the respective grooves 73 are radially connected to respective rings 41, 42 of the corrugation 40 and the stretches 74 are radially connected to respective stretches 47 of the corrugation 40 (FIG. 3).

In the case illustrated, each corrugation 71 comprises two ridges 72 and a groove 73 axially interposed between the ridges 72.

The ridges 72 define opposite axial ends 75, 76 of the corrugation 71, in the case illustrated.

With reference to FIG. 3, each rib 40 further comprises:
a pair of flanges 180, 181 carried respectively by the ridges 72 and fixed respectively to the rings 41;
a flange 182 carried by the grooves 73 and fixed to the ring 42; and
a plurality of flanges 183, two in the case illustrated, carried by the stretches 47 and interposed between the flanges 180, 182 and 182, 181 and fixed to a respective stretch 47.

In the case illustrated, the flanges 180, 181, 182, 183 extend like an arc over a length greater than the circumferential extension of the ribs 69, 70.

The flanges 180, 181 each comprise a surface 184 orthogonal to the axis E and a surface 185 protruding in a cantilever manner from the surface 184 parallel to the axis E.

The surface 185 of the flange 180 extends in a cantilever manner from the relative surface 184 towards the surface 185 of the flange 181.

The element 36 further comprises a plurality of strips 100, acting as joint covers, associated with respective ribs 69, 70.

In greater detail, the strips 100 are housed inside the element 36.

In particular, element 36 is obtained by approaching and connecting a pair of half-elements 37 (only one of which is partially visible in FIG. 3), which each extend over one hundred and eighty degrees in a section obtained with a plane orthogonal to the axis E.

The flanges 180, 181, 182, 183 and the strips 100 connect between them the aforesaid half-elements 37 respectively in a position that is radially external and radially internal to the axis E.

The flanges 180, 181, 182, 183 help to react to the loads parallel to the axis E while the strips 100 substantially perform the function of joint cover.

The corrugation 40 is radially interposed between each strip 100 and the relative rib 69, 70.

Each strip 100 is delimited in an axial direction by two arched stretches 101 arranged at respective flanges 180, 181.

Each strip 100 is delimited in a circumferential direction by a pair of stretches 103 that are parallel to each other and axially interposed between the stretches 101.

Each strip 100 defines a relative corrugation 104 with a longitudinal direction of extension parallel to the axis E and a thickness radial to the axis E.

The corrugation 104 comprises respective pluralities of ridges 105 and grooves 106 shaped as arc sectors around the axis E.

The ridges 105 and the grooves 106 are alternated between them parallel to the axis E and define respective radial ends opposite one another of the respective corrugation 104.

The ridges 105 are arranged at a first radial distance from the axis E.

The grooves 106 are arranged at a second radial distance from the axis E that is smaller than the aforesaid first axial distance.

The ridges 105 (the grooves 106) are all arranged at the same first (second) radial distance from the axis E, in the case illustrated.

In particular, the ridges 105 and the grooves 106 respectively define the points of maximum and minimum distance of the corrugation 104 from the axis E.

The ridges 105 and the grooves 106 are shaped as respective circumference arcs having a centre on the axis E.

The corrugation 104 has a plurality of connecting stretches 107 shaped like an arc and each interposed between a respective ridge 105 and the respective grooves 106 adjacent thereto.

Each stretch 107 extends starting from the respective ridge 105 at progressively increasing axial and radial distances towards the respective grooves 106.

The corrugation 104 has a coil shape in the section parallel to the axis E, in the case illustrated.

In the case illustrated, each strip 100 is made of aluminium or composite material.

With reference to FIGS. 4 to 7, the joint 35 comprises a plurality of pairs of ribs 69, 70 coupled to the element 36 and arranged axially consecutive to each other.

The ribs 69, 70 of each pair are angularly spaced, by one hundred and eighty degrees in the case illustrated.

The ribs 69, 70 of each pair are arranged in the same axial position with respect to the axis E.

The ribs 69, 70 of pairs that are consecutive between them along the axis E are angularly offset, by one hundred and eighty degrees in the case illustrated.

Preferably, each rib 69, 70 comprises a relative stretch 90 (FIG. 5) housed inside the element 36 and radially opposite to the respective stretch 89.

In particular, the element 36 is made of composite material, in particular a fibre-reinforced laminate, while the ribs 69, 70 are made of aluminium or other metal, or of composite or a combination of metal and composite.

The element 36 houses the discs 27a, 27b and the portions of the output shaft 12 and the output shaft 21 connected to the respective flanges 38, 39 (FIG. 2).

In use, the motor group 3 drags the output shaft 11 in rotation around the axis C.

The output shaft 12 drives the input shaft 21 of the transmission 7 in rotation around the axis D.

The transmission 7 drives the control shaft 8 of the rotor 4 in rotation around the axis A.

The corrugated element 36 of the joint 35 connects the sleeves 29, 30 carried by the stators 11, 20 respectively of the motor group 3 and of the transmission 7.

More precisely, thanks to its torsional rigidity, the corrugated element 36 allows to transmit to the sleeve 30 the torques directed along the axis E and transmitted from the output shaft 12 to the sleeve 29.

Thanks to its own flexural elastic deformability, the corrugated element 36 allows the inclination between the axes C, D in a pair of planes parallel to the axes C, D, E themselves.

This inclination is allowed by the flexural elastic deformability (FIG. 6) of the corrugated element 36.

This elastic flexural deformability is obtained thanks to the presence of the corrugation 40 and to the fact that the corrugated element 36 is made of a fibre-reinforced composite laminate.

The ribs 69, 70 confer axial rigidity to the joint 35 thus allowing the transmission of loads that are parallel to the axes C, D, E between the sleeves 29, 30.

The advantages that it allows to obtain are evident from the characteristics of the helicopter 1 according to the present invention.

In particular, the joint 35 interposed between the output shaft 12 of the motor group 3 and the input shaft 21 of the transmission 7 comprises the corrugated element 36 with a high torsional rigidity and flexural deformability.

Said torsional rigidity and flexural deformability are determined by the corrugation 40, which has a length parallel to the axis E and a thickness transverse to the axis E.

Thanks to the aforesaid torsional rigidity, the joint 35 allows to efficiently transmit between the sleeves 29, 30 the reaction torque from the output shaft 12 under normal operating conditions, and also the torque due to particular operating conditions, for example in the case of blockage of the motor group 3.

At the same time, thanks to the aforesaid flexural elastic deformability, the joint 35 allows the inclination between the sleeves 29, 30 in a pair of planes that are parallel to the axes C, D, E.

In other words, the corrugations 40 allow to decouple the rigidities and the load paths.

It is important to underline that these characteristics are obtained without requiring the use of numerous components articulated between them unlike the solutions of the known type and discussed in the introductory part of the present description, with evident advantages of reduction in weight and construction simplification.

The ribs 69, 70 confer the joint 35 the necessary axial rigidity adapted to allow the transmission of forces between the sleeves 29, 30 parallel to the axes E, C, D, without significantly compromising the flexural flexibility of the joint.

In other words, the ribs 69, 70 further help to decouple the rigidities and the load paths of the joint 35.

The corrugations 71 of the ribs 69, 70 are axially constrained to the corrugations 40 of the element 36. This allows to stabilize the ribs 69, 70 considerably, increasing the maximum peak load stress that can be supported by the ribs 69, 70 themselves.

The aforesaid characteristics of the joint 35 can be optimized by suitably choosing the lamination sequence of the fibre-reinforced material of the element 36 and of the ribs 69, 70.

It is clear that the helicopter 1 described and illustrated herein may be subject to modifications and variations without thereby departing from the scope of protection defined by the claims.

In particular, the corrugations 40, 71, 104 could be shaped at least in part as broken segments joined to each other and/or with curved stretches.

Furthermore, the corrugated element 36 could not be axial-symmetrical around the axis E. For example, the corrugated element 36 could have an oval section so as to obtain flexural rigidities that are different from each other in the different planes parallel to the axis E. Alternatively, the corrugated element 36 could have a conical or barrel shape.

Finally, the axes C, D could be inclined or skewed with respect to each other.

The invention claimed is:

1. A helicopter (1) comprising:
   at least one motor member (3) comprising an output shaft (12) and a first stator (11, 29) rotatably supporting said output shaft (12) around a first axis (C);
   a main rotor (4) adapted to provide the lift necessary for the support and the thrust necessary for the movement of the helicopter (1) itself;
   a transmission (7) interposed between said motor member (3) and said main rotor (4); said transmission (7) comprising, in turn, an input shaft (21) rotatable around a second axis (D) and a second stator (20, 30) rotatably supporting said input shaft (21) around said second axis (D); and
   a joint (35) interposed between said first and second stator (11, 29; 20, 30), angularly fixed with respect to said first axis (C), and configured to allow an inclination between said first and second stator (11, 29; 20, 30) in at least one plane parallel to said first axis (C);
   characterized in that said joint (35) comprises a first corrugated element (36) made of an elastically deformable material, interposed between said first and second stator (11, 29; 20, 30), and adapted to allow said inclination through elastic deformation;
   wherein said first corrugated element (36) extends along a third axis (E);
   said first corrugated element (36) being torsionally rigid parallel to said third axis (E) and flexurally yielding in an elastic way in said at least one plane parallel to said first axis (C) and also to said third axis (E);
   said joint (35) comprising at least a second axial corrugated element (69, 70) coupled to said first corrugated element (36);
   the second corrugated element (69, 70) being shaped like a rib (69, 70) elongated parallel to said third axis (E) and eccentric with respect to said third axis (E).

2. The helicopter according to claim 1, characterized in that said third axis (E) joins said first axis (C) and second axis (D), at least when said first corrugated element (36) is, in use, undeformed.

3. The helicopter according to claim 2, characterized in that said first corrugated element (36) is axial-symmetrical with respect to said third axis (E).

4. The helicopter according to claim 1, characterized in that said first, second and third axes (C, D, E) coincide.

5. The helicopter according to claim 1, characterized in that said first corrugated element (36) has a first corrugation (40) with a direction of extension that is parallel to said third axis (E) and a radial thickness with respect to said third axis (E).

6. The helicopter according to claim 1, characterized in that said at least one second corrugated element (69, 70) has a second corrugation (71) with a direction of extension that is parallel to said third axis (E) and a radial thickness with respect to said third axis (E);
   said first and second corrugations (40, 71) being coupled between them so as to constrain said at least one second corrugated element (69, 70) to said first corrugated element (36) at least in a direction parallel to said third axis (E).

7. The helicopter according to claim 1, characterized in that said at least one second corrugated element (69, 70) comprises a plurality of pairs of said second corrugated elements (69, 70);
   said second corrugated elements (69, 70) of each said pair being angularly offset between them with respect to said third axis (E) and being axially arranged;
   said second corrugated elements (69,70) of said axially consecutive pairs being angularly offset between them.

8. The helicopter according to claim 1, characterized in that said second corrugated element (69, 70) is axially rigid and flexurally yielding, with reference to said third axis (E).

9. The helicopter according to claim 6, characterized in that said second corrugation (71) is arranged radially external with respect to said first corrugation (40).

10. The helicopter according to claim 1, characterized in that said joint (35) comprises, for each of said at least one second corrugated element (69,70), a strip (100) defining a third corrugation (104) with a direction of extension that is parallel to said third axis (E) and a radial thickness with respect to said third axis (E);

said first corrugation (40) being radially interposed between said strip (100) and said second corrugation (71).

11. The helicopter according to claim 10, characterized in that said first corrugated element (36) comprises a pair of half-elements (37) connected to each other through said strip (100) in a radially internal position with respect to said third axis (E) and through said second corrugated element (69, 70) in a radially external position with respect to said third axis (E).

12. The helicopter according to claim 1, characterized in that said first and/or second corrugated element (36; 69, 70) are made of a fibre-reinforced composite material.

13. The helicopter according to claim 1, further comprising a further joint (25) which is rotatable and interposed between said output shaft (12) and said output shaft (21);

said further joint (25) being housed inside said first corrugated element (36).

* * * * *